US011460545B2

(12) United States Patent
Jain et al.

(10) Patent No.: US 11,460,545 B2
(45) Date of Patent: Oct. 4, 2022

(54) SOLID STATE LIDAR SILICON PHOTONICS

(71) Applicant: Seagate Technology LLC, Cupertino, CA (US)

(72) Inventors: Aditya Jain, Minneapolis, MN (US); Zoran Jandric, St. Louis Park, MN (US); Krishnan Subramanian, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 454 days.

(21) Appl. No.: 16/721,598

(22) Filed: Dec. 19, 2019

(65) Prior Publication Data
US 2020/0371208 A1 Nov. 26, 2020

Related U.S. Application Data

(60) Provisional application No. 62/852,858, filed on May 24, 2019.

(51) Int. Cl.
G01S 7/481 (2006.01)
G02F 1/015 (2006.01)
G02F 1/29 (2006.01)
G02B 17/00 (2006.01)
G01S 17/06 (2006.01)

(52) U.S. Cl.
CPC ............ G01S 7/481 (2013.01); G01S 7/4817 (2013.01); G01S 17/06 (2013.01); G02B 17/004 (2013.01); G02F 1/015 (2013.01); G02F 1/292 (2013.01); G02F 1/291 (2021.01); G02F 2202/30 (2013.01); G02F 2203/48 (2013.01); G02F 2203/50 (2013.01)

(58) Field of Classification Search
CPC .... A61P 43/00; A61P 9/00; A61P 9/04; A61P 9/12; C07D 487/04; Y02W 30/52; Y02W 30/62; G01S 17/06; G01S 17/42; G01S 7/481; G01S 7/4817; G01S 7/4818; G02B 17/004; G02B 2006/12061; G02B 2006/12097; G02B 2006/12142; G02B 6/12004; G02B 6/2813; G02F 1/015; G02F 1/291; G02F 1/292; G02F 2202/30; G02F 2203/48; G02F 2203/50
See application file for complete search history.

(56) References Cited

U.S. PATENT DOCUMENTS 6,341,118 B1 * 1/2002 Drobot .................. G11B 7/124
369/44.37
7,410,274 B2 * 8/2008 Nagabuchi ............ F21S 43/315
362/346
8,908,738 B2 12/2014 Dergachev
10,281,322 B2 5/2019 Doylend et al.
2004/0012843 A1 * 1/2004 Aozasa ............... H01S 3/13013
359/341.5

(Continued)

Primary Examiner — Joseph P Martinez
Assistant Examiner — Vipin Patel
(74) Attorney, Agent, or Firm — Faegre Drinker Biddle & Reath LLP

(57) ABSTRACT

A device includes a light splitter configured to receive a source light beam from a light source and split the source light beam into separate light beams, each emitted through an outlet. The device also includes resonators, each of which is optically coupled to at least one of the outlets and is configured to steer at least one of the light beams.

20 Claims, 6 Drawing Sheets

(56) References Cited

U.S. PATENT DOCUMENTS

| | | |
|---|---|---|
| 2006/0098695 A1* | 5/2006 | Mitrofanov .......... G01R 15/241 |
| | | 372/12 |
| 2010/0187442 A1* | 7/2010 | Hochberg ............... G01S 17/42 |
| | | 250/492.1 |
| 2013/0242400 A1* | 9/2013 | Chen .................. G02B 27/0087 |
| | | 359/618 |
| 2018/0217472 A1 | 8/2018 | Poulton et al. |
| 2019/0049584 A1 | 2/2019 | Schmalenberg et al. |
| 2019/0064332 A1 | 2/2019 | Schmalenberg et al. |
| 2019/0187284 A1 | 6/2019 | Raring et al. |
| 2019/0219885 A1 | 7/2019 | Watts et al. |

* cited by examiner

SOLID STATE LIDAR SILICON PHOTONICS

CROSS-REFERENCE TO RELATED APPLICATION

This application claims priority to U.S. Provisional Application No. 62/852,858, filed May 24, 2019, which is herein incorporated by reference in its entirety.

SUMMARY

In certain embodiments, a device includes a light splitter configured to receive a source light beam from a light source and split the source light beam into separate light beams, each emitted through an outlet. The device also includes resonators, each of which is optically coupled to at least one of the outlets and is configured to steer at least one of the light beams.

In certain embodiments, a device includes a light splitter configured to receive a source light beam from a light source and split the source light beam into separate light beams, each emitted through an outlet. The device also includes resonators, each of which is optically coupled to at least one of the outlets and is configured to steer at least one of the light beams. Each resonator includes a ring assembly.

In certain embodiments, a solid state light detection and ranging device includes a substrate and an electronic/photonic integrated light-coupling circuit supported by the substrate and configured to consume less than one Watt of power. The circuit includes a light splitter configured to receive a source light beam from a light source and split the source light beam into at least 200 separate light beams, each emitted through an outlet. The circuit also includes resonators, each of which is optically coupled to at least one of the outlets and is configured to steer at least one of the light beams.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
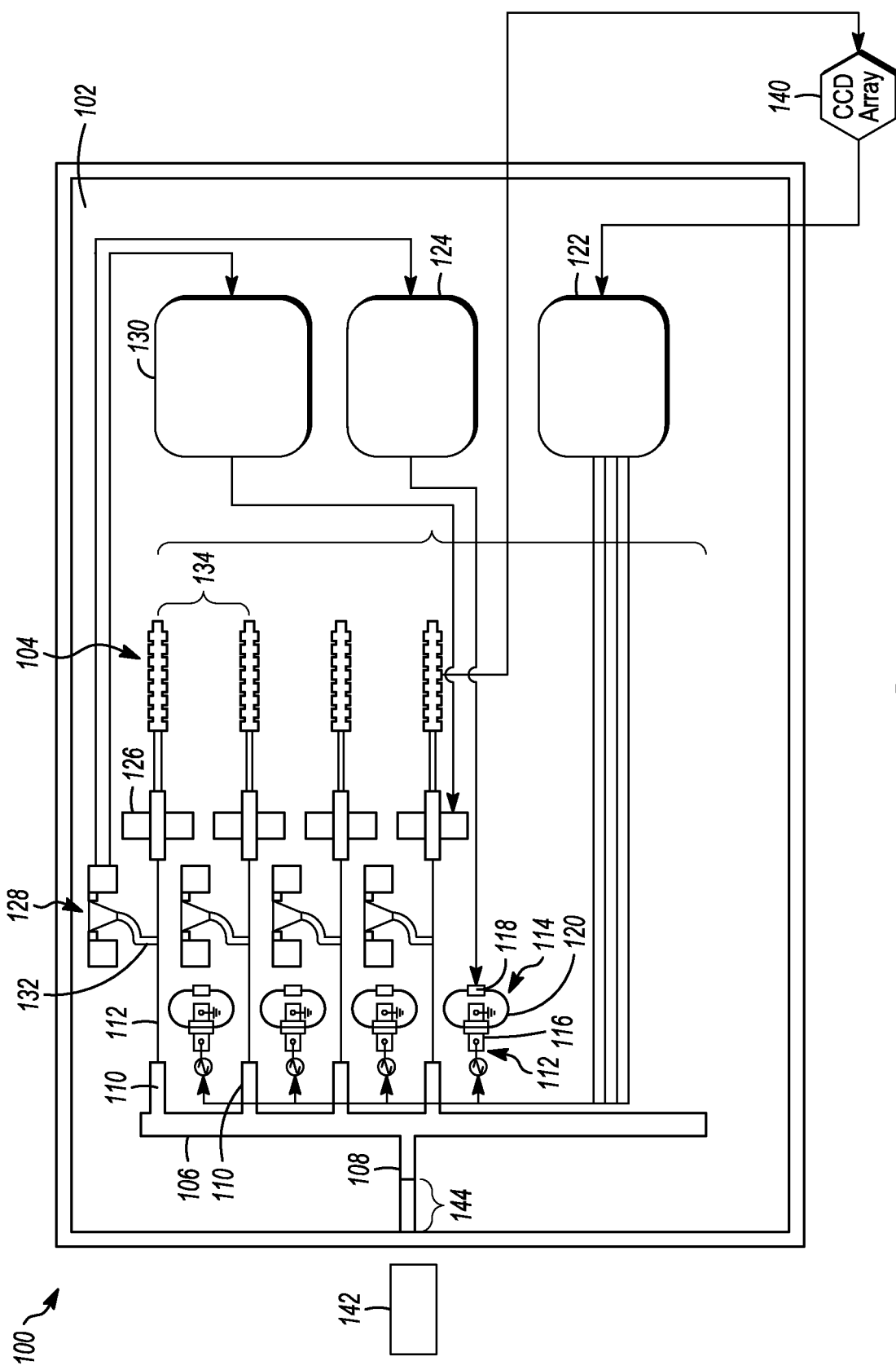
FIG. 1 shows a schematic view of a LIDAR/LADAR device, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope of the appended claims.

DETAILED DESCRIPTION

Certain embodiments of the present disclosure relate to measurement devices and techniques, particularly, measurement devices and techniques for light detection and ranging, which is commonly referred to as LIDAR, LADAR, etc (all of which may be referred to herein, generally, as LIDAR). Current LIDAR devices are mechanical and typically use a series of spinning mirrors that steer many narrow light beams. These devices are expensive, consume a large amount of power, and have moving pieces that can break or become misaligned, which negatively affects performance.

An alternative to mechanical LIDAR is solid state LIDAR. Solid state LIDAR devices consume less power, are cheaper to manufacture, and can have a smaller footprint than mechanical LIDAR devices. Certain embodiments of the present disclosure are accordingly directed to solid state LIDAR systems, methods, and devices that can be used to steer light to generate scanning patterns of light (e.g., paths along which light is scanned) with a two-dimensional field of view.

FIG. 1 shows a schematic of a device 100 such as a LIDAR device that can emit and steer light. The device 100 may be, for example, a tunable on-chip solid state LIDAR device and may be fabricated on a CMOS compatible platform. The device 100 includes a substrate 102 and an electronic/photonic integrated light-coupling circuit 104 supported by the substrate 102. In embodiments, the on-chip solid state LIDAR device 100 provides a LIDAR solution that occupies less space than mechanical LIDAR platforms and consumes less power. For example, mechanical systems may require approximately 20-40 Watts of power to operate, while embodiments of the on-chip solid state LIDAR described herein may be configured to require only about one-half of a Watt.

As shown in FIG. 1, the circuit 104 includes a light splitter 106 configured to split a source light beam into a number of separate light beams. The light splitter (which may be referred to, interchangeably, as a "beam splitter") 106 includes an inlet 108 and a number of outlets 110. The light splitter 106 may include any number of outlets 110 such as, for example, 10, 100, 200, 500, and/or the like. As discussed further with reference to FIGS. 2A-2D, the light splitter 106 may actually include a number of light splitter components connected in series.

As is further shown in FIG. 1, an optical waveguide 112 is optically coupled to each outlet 110 of the light splitter 106. According to embodiments, each optical waveguide 112 includes a resonator 114 optically coupled to the corresponding outlet 110 and configured to steer the light beam emitted from the outlet 110. In embodiments, a resonator 114 may be coupled to more than one outlet and configured to steer at least one light beam. Each resonator 114 may be configured to shift the phase of the light beam passing therethrough so that each light beam exiting from each resonator 114 has a different phase than each other light beam exiting from each other resonator 114.

As shown, each resonator 114 may include a ring assembly. As shown in FIG. 1, each ring assembly 114 includes a P-I-N phase shifter 116, a tunable heater 118, and a ring structure 120 disposed between them. A phase shifter control module 122 is electrically connected to each of the P-I-N phase shifters 116 and a heater control module 124 is electrically connected to each of the tunable heaters 118. The control modules 122 and 124 control the phase shifters 116 and heaters 118, respectively, to cause each of the respective light beams to have a different phase from each of the others. To do so, for example, the control modules 122 and 124 may be configured to apply different voltages to each of the phase shifters 116 and heaters 118, respectively. In embodiments, the heater control module 124 may be configured to control the tunable heaters 118 to maintain a stable temperature of the resonator 114 in response to temperature changes in the surrounding environment (e.g., in the case of a vehicle-mounted LIDAR, temperature changes caused by the vehicle's engine).

As a consequence of the geometry of the ring structures and the operation of the P-I-N phase shifters, the different light beams are caused to have different amplitudes as their phases are shifted. For LIDAR, it is desirable to have equal amplitudes across the waveguides 112 and, accordingly, the circuit 104 further includes a variable optical attenuator (VOA) 126 coupled to each optical waveguide 112 (and, thus, optically coupled to each resonator 114). The VOAs 126 are configured to equalize the amplitudes of the light beams across the waveguides 112.

As shown, a monitor photodiode 128 is optically connected to each waveguide 112 (and, thus, optically coupled to each resonator 114) and is configured to sense the power of the light beam in the connected waveguide 112 (e.g., the light beam emitted from the resonator 114) and to communicate that sensed power to a VOA control module 130, which is electrically connected to each of the VOAs 126. In this manner, the VOA control module 130 determines the power levels of each of the light beams in each of the waveguides 112 and, in response, causes one or more of the VOAs 126 to selectively absorb light to equalize the power across the waveguides 112, which corresponds to an equalization of the amplitudes. According to embodiments, the monitor photodiode 128 may be a germanium photodiode coupled to the waveguide using a 99%-1% coupler 132. As shown in FIG. 1, the monitor photodiode 128 also may be electrically coupled to the heater control module 124 so that the heater control module 124 can adjust the voltage applied to a corresponding tunable heater 118 based on the sensed power of the light beam.

As is further shown in FIG. 1, a grating coupler 134 is optically connected to the output 136 of each VOA 126 via a waveguide 138. The array of grating couplers 134 is configured to couple the light from the waveguides 138 to free space. The grating couplers 134 may be configured and arranged to achieve a certain wavelength or range of wavelengths of light coupling to free space. In embodiments, for example, each pair of adjacent grating couplers 134 are configured to minimize the coupling of light from a first grating coupler 134 into a second, adjacent, grating coupler 134. This may be accomplished, for example, by selecting certain dimensions such as, for example, the distance between the leading edge of adjacent teeth, the width of a tooth, the distance between adjacent grating couplers 134, the overall length of each grating coupler 134, and/or the like. In embodiments, an external attenuator may be disposed between the grating couplers 134 and the free space.

The device 100 may also include a charge-coupled device (CCD) array 140 configured to sample light being emitted from the device 100 and the resulting data may be used, for example, in a feedback loop by the phase shift control module 122 or other component of the device 100. That is, for example, one or more of the grating couplers 134 may be configured to direct some of the light toward the CCD array 140 for use in a feedback process.

As shown in FIG. 1, the substrate 102 is optically coupled to a light source 142. For example, the substrate 102 may include an edge coupler 144 configured to receive light emitted from the light source 142. In certain embodiments, the light source 142 is manufactured separately from the other components of the device 100 and later attached to the substrate 102 or to a waveguide (not shown) positioned between the light source 142 and the substrate 102. The light source 142 emits a light beam and is arranged such that the emitted light beam is directed towards the substrate 102 or to a separate waveguide. As described above, the emitted light passes into the optical circuit 104 via the edge coupler 144.

The light source 142 can be a laser (e.g., a laser such as a VCSEL and the like) or a light-emitting diode. In certain embodiments, the light emitted is coherent light. In certain embodiments, the light source 142 emits light within the infrared spectrum (e.g., 905 nm or 1550 nm frequencies) while in other embodiments the light source 142 emits light within the visible spectrum (e.g., a 485 nm frequency). In certain embodiments, the light source 142 is configured to emit light in pulses. Non-limiting examples of pulse rates for the light source 142 include 100-1000 kHz, 200-800 kHz, and 300-600 kHz. Although the measurement devices described herein reference are typically described in the context of pulsed, time-of-flight LIDAR approaches, the device 100 can be used for continuous-wave LIDAR, frequency-modulated LIDAR, amplitude-modulated LIDAR, etc., as well.

Figure 2A:
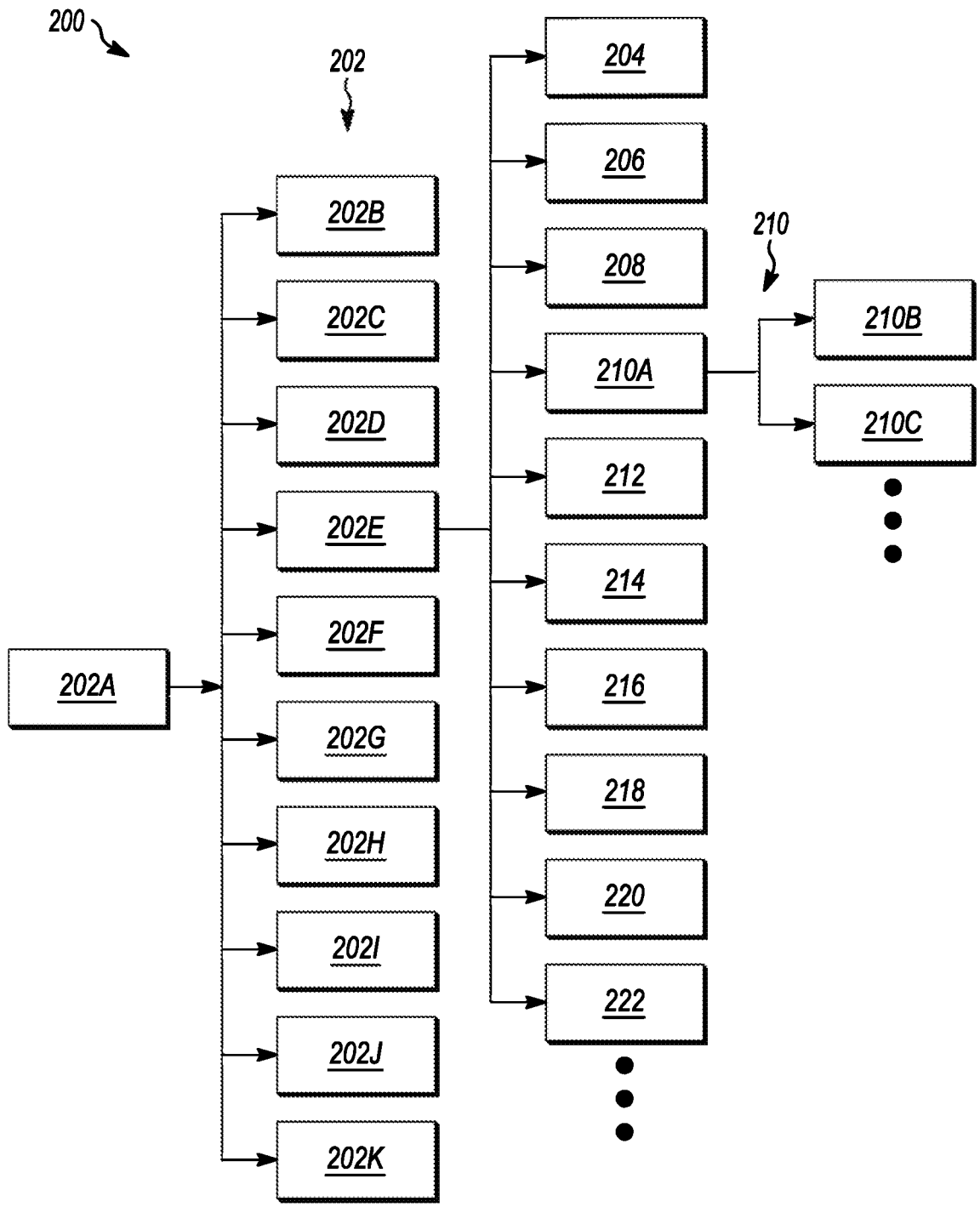
FIG. 2A is a schematic of a light splitter, in accordance with certain embodiments of the present disclosure.

As explained above, embodiments of the LIDAR device described herein include a light splitter. FIG. 2A is a schematic of a light splitter 200 in accordance with embodiments of the subject matter disclosed herein. The light splitter 200 may be, be similar to, include, or be included in the light splitter 106 depicted in FIG. 1. As shown in FIG. 2A, the light splitter 200 includes a number of light splitter components 202, 204, etc, connected in series. That is, for example, as shown, the light splitter 200 includes a first light splitter component 202 that includes one inlet 202A and ten outlets 202B-202K. Each of the ten outlets 202B-202K may be connected to an inlet 204, 206, 208, 210A, 212, 214, 216, 218, 220, 222, etc. of another light splitter component. As shown, for example, with regard to a second light splitting component 210, each of the additional light splitter components may include any number of outlets 210B, 210C, etc. In this manner, an incoming source light beam may be split into a large number of light beams (e.g., 200, 500).

Figure 2B:
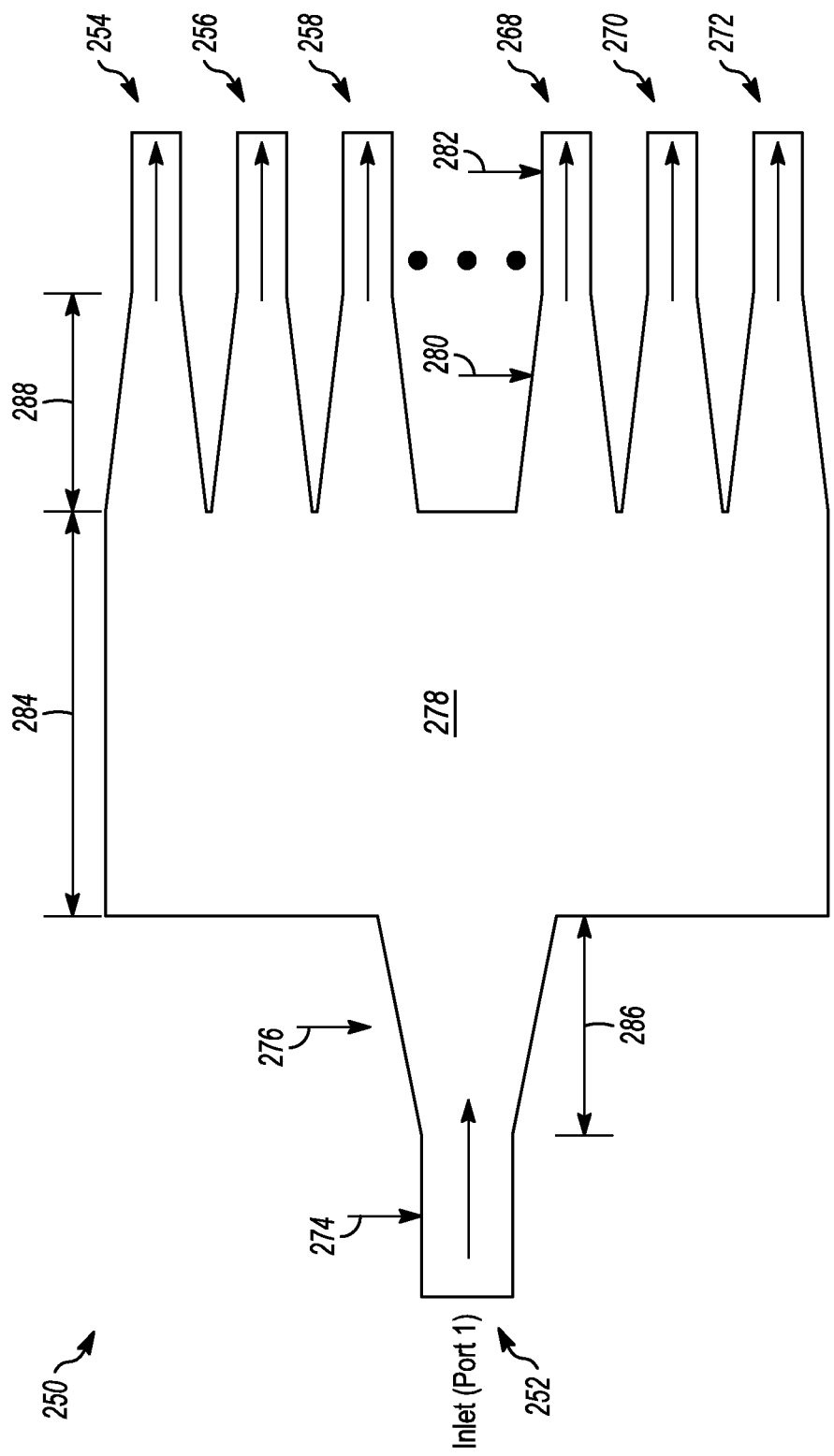
FIG. 2B is a schematic of an illustrative light splitter component, in accordance with certain embodiments of the present disclosure.

FIG. 2B is a schematic of an illustrative light splitter component 250 in accordance with embodiments of the subject matter disclosed herein. According to embodiments, the light splitter component 250 may be, be similar to, or include any of the light splitter components 202, 204, and 210 depicted in FIG. 2A. As shown in FIG. 2B, the light splitter component 250 includes an inlet 252 (also labeled as "Port 1" in FIG. 2B) and ten outlets, though only six outlets 254 (labeled "Port 2"), 256 (labeled "Port 3"), 258 (labeled "Port 4"), 268 (labeled "Port 9"), 270 (labeled "Port 10"), and 272 (labeled "Port 11") are illustrated in FIG. 2B. In embodiments, the light splitter component 250 may include any number of outlets such as, for example, 2, 5, 8, 10, 20, 50, and/or the like.

As is further shown in FIG. 2B, the inlet 252 includes an inlet waveguide 274 and an inlet taper 276. The inlet taper 276 is also a waveguide, but it is tapered to expand in diameter between the inlet waveguide 274 and the slab 278 of the light splitter component 250. Similarly, each outlet, as shown with reference to outlet 268, includes an outlet taper 280 and an outlet waveguide 282. The outlet taper 280 is also a waveguide, but is tapered to decrease in diameter between the slab 278 of the component and the outlet waveguide 282.

Figure 2C:
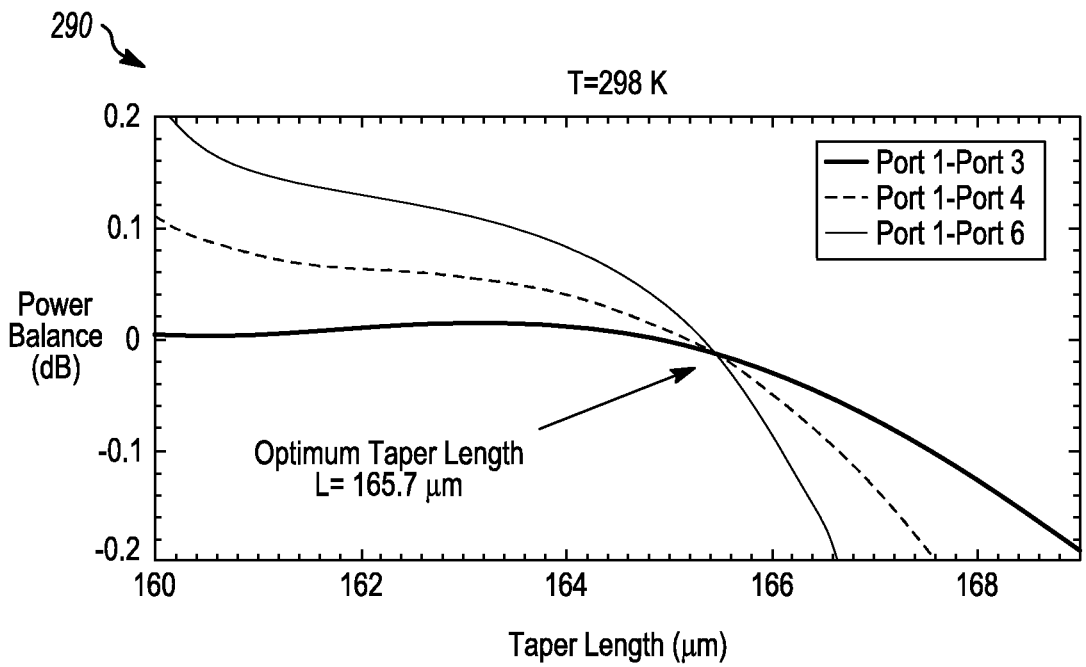
FIG. 2C depicts an illustrative graph that may be used for optimizing the taper length of the inlet and outlets of a light splitter component, in accordance with certain embodiments of the present disclosure.
Figure 2D:
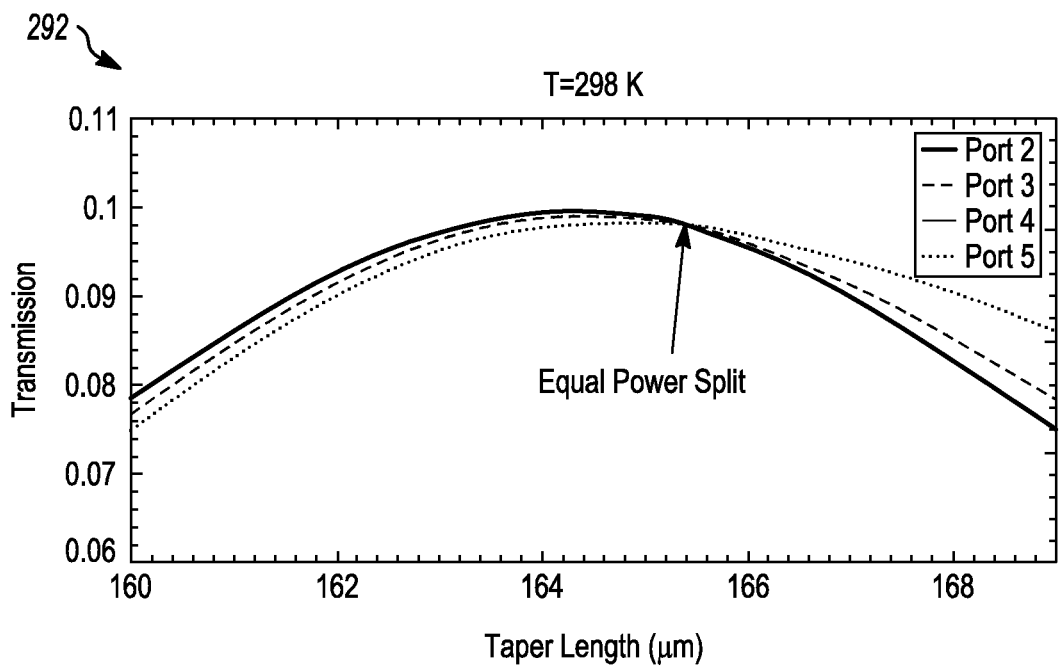
FIG. 2D depicts an illustrative graph that may be used to optimize taper length based on achieving an equal power split among the outlet ports, in accordance with certain embodiments of the present disclosure.

In embodiments, the splitter component 250 may be configured to split the incoming source light beam into light beams having at least approximately equal power levels. The splitter component 250 may be made of crystalline silicone and may be configured, for example, as a 1×10 multi-mode interference (MMI) splitter. The splitter component 250 may be configured to have a single mode input and a single mode output, while the light has multiple modes while in the slab 278. To achieve a desired power level and power balance, the length 284 of the slab, the thickness of the slab, the length 286 of the inlet taper 276, and/or the length 288 of the outlet taper 280 may be selected. FIG. 2C, for example, depicts an illustrative graph 290 that may be used for optimizing the taper length of the inlet and outlets of a 220 nm thick light splitter component based on Power Balance, where Power Balance (Port n–Port m)=Transmission(Port n)/Transmission (Port m). FIG. 2D depicts an illustrative graph 292 that may be used to optimize taper length based on achieving an equal power split among the outlet ports. In embodiments, a combination of the optimizations depicted in FIGS. 2C and 2D (with or without other considerations) may be used, for example, to optimize the lengths of the inlet and outlet tapers.

Figure 3A:
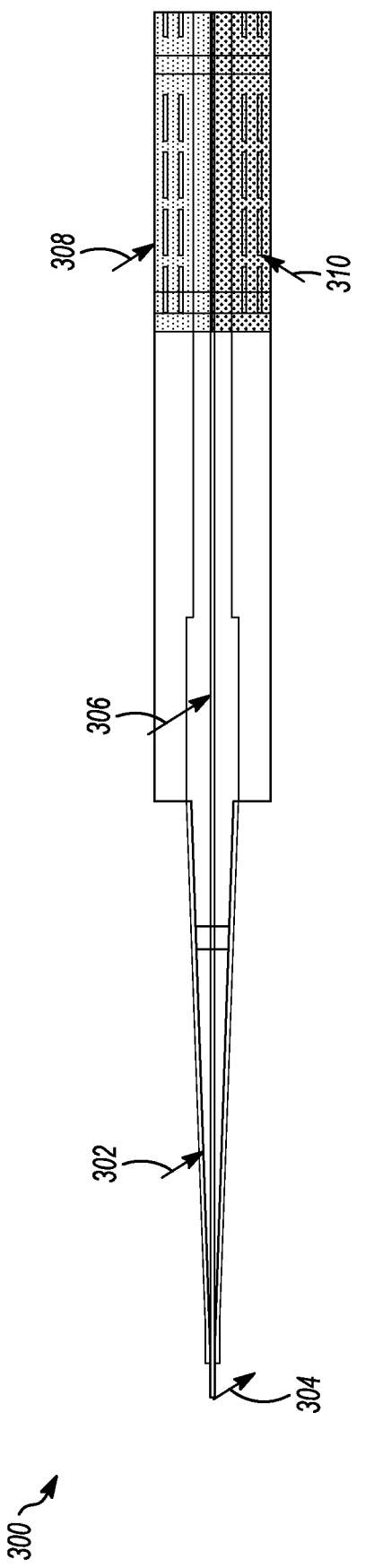
FIG. 3A is a schematic top view of an illustrative P-I-N phase shifter, in accordance with certain embodiments of the present disclosure.

As explained above, with reference to FIG. 1, LIDAR devices described herein may include a number of P-I-N phase shifters configured to shift the phases of light beams with respect to one another. FIG. 3A is a schematic top view of an illustrative P-I-N phase shifter 300 in accordance with embodiments of the subject matter disclosed herein. According to embodiments, the phase shifter 300 may be, be similar to, include, or be included in any of the phase shifters 116 depicted in FIG. 1. As shown in FIG. 3A, the phase shifter 300 includes a first region 302 that couples the strip waveguide 304 exiting the outlet of the light splitter to a rib waveguide 306, the rib waveguide 306, and a doped region 308. As shown, electrical contacts 310 may be coupled to (and/or disposed within) the doped region 308 and used for injecting current.

Figure 3B:
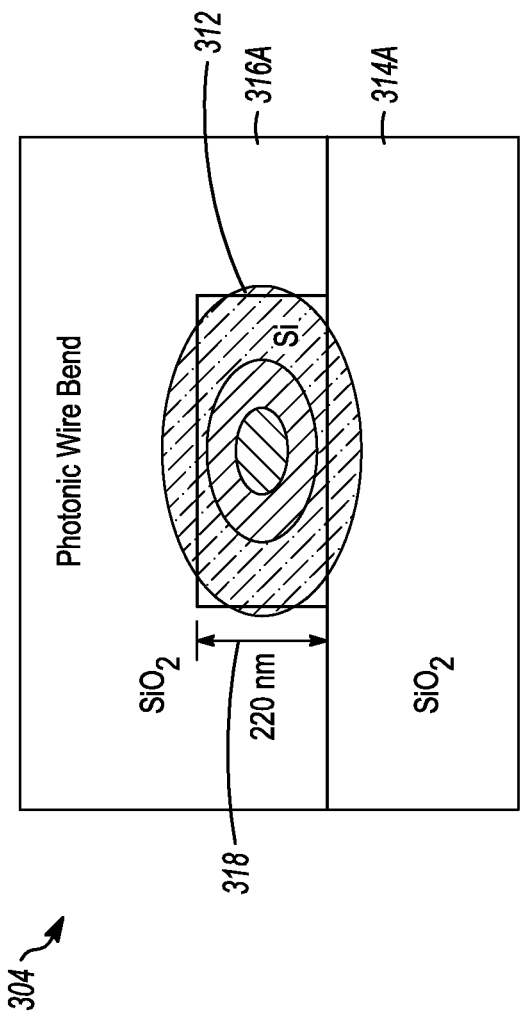
FIG. 3B is an illustrative cross section of the strip waveguide depicted in FIG. 3A, in accordance with certain embodiments of the present disclosure.
Figure 3C:
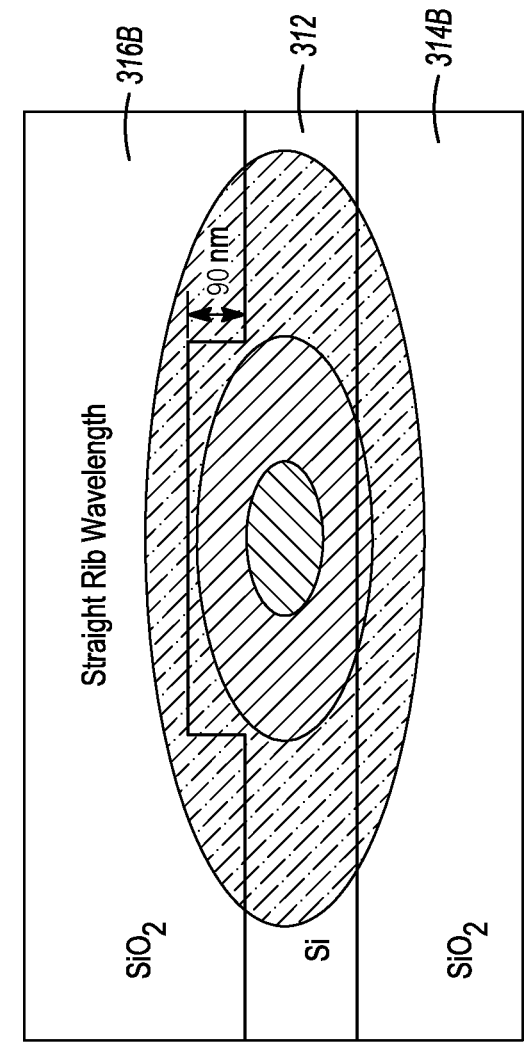
FIG. 3C is an illustrative cross section of the rib waveguide depicted in FIG. 3A, in accordance with certain embodiments of the present disclosure.

The first region 302 may be tapered to increase diameter from that of the strip waveguide 304 to that of the rib waveguide 306. FIG. 3B is an illustrative cross section of the strip waveguide 304, showing that the strip waveguide 304 includes a layer 312 of silicon embedded between a first layer 314A of silicon dioxide and a second layer 316A of silicon dioxide. The layer 312 of silicon has a thickness 318 of, for example, approximately 220 nm. As shown in FIG. 3C, which is an illustrative cross section of the rib waveguide 306, the rib waveguide 306 may include a silicon layer 312 that extends the width of the waveguide 306 and that has a ribbed portion in the center having a thickness equal to that of the strip waveguide 304 disposed between regions 314B and 316B that have a thickness less than that of the ribbed portion (e.g., by approximately 70 nm).

Figure 3D:
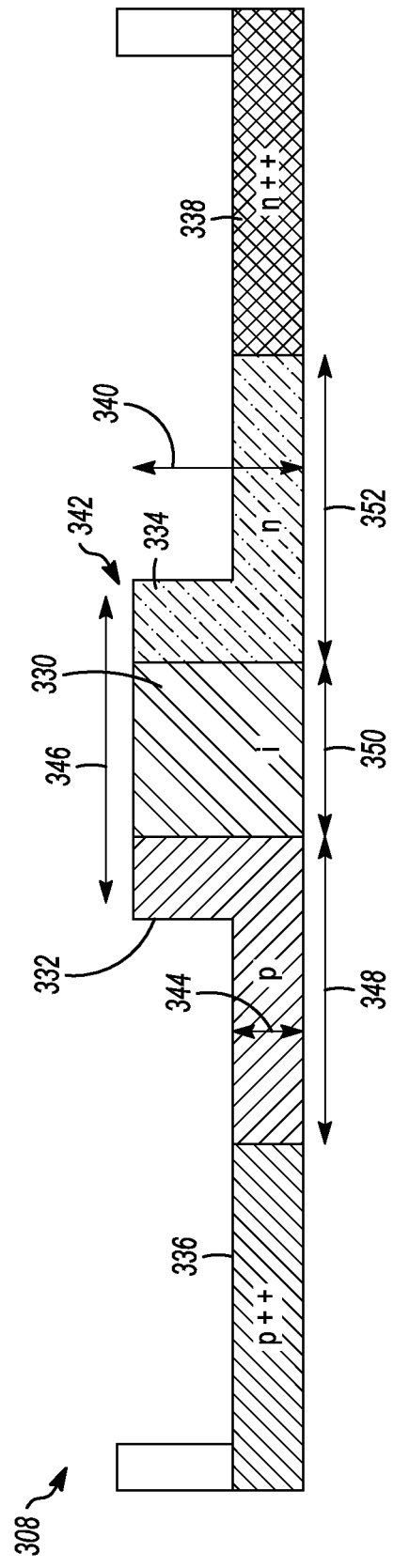
FIG. 3D is a schematic cross-sectional view of the doped region depicted in FIG. 3A, in accordance with certain embodiments of the present disclosure.

FIG. 3D is a schematic cross-sectional view of the doped region 308 in accordance with embodiments of the subject matter disclosed herein. As shown in FIG. 3D, the doped region 308 includes an intrinsic semiconductor portion 330 disposed between a p-type doped portion 332 and an n-type doped portion 334. A heavily-doped p-type portion 336 is disposed adjacent the p-type doped portion 332 and a heavily-doped n-type portion 338 is disposed adjacent the n-type doped portion 334. In embodiments, the thickness 340 of the ribbed section 342 in the center of the doped region 308 may be equal to the thickness of the strip waveguide 304. In that manner, for example, any number of the components (and, in embodiments, all of the components) of the optical circuit have a consistent maximum thickness (e.g., of 220 nm). That thickness may be, for example, approximately 120 nm thicker than the thickness 344 of the remainder of the doped region 308.

The widths and lengths of the various portions of the doped region 308 (and/or the tapered region 302 and/or the rib waveguide 306) may be selected to achieve a linear phase shift, while using as short a structure as possible, to minimize loss. For example, as shown in FIG. 3D, the central ribbed section 342 may have a width 346 of approximately 500 nm, the p-type doped portion 332 may have a width 348 of approximately 1000 nm, the intrinsic portion 330 may have a width 350 of approximately 250 nm, and the n-type doped portion 334 may have a width of approximately 1000 nm. According to embodiments, any number of the various dimensions may be different than illustrated and may be selected so as to achieve a linear phase shift, while keeping losses low and the size of the device small. In embodiments, the amount of voltage necessary to shift the beam component by π may be determined based on the dimensions of the portions of the phase shifter and may be, for example, approximately 5V for a 5.5 mm device, 7V for a 4 mm device, and/or the like. As guidance, the length of the device is related to the voltage by the formulae as follows:

$$L_{device} = \frac{\lambda}{n_0 V}$$

Where $L_{device}$ is the length of the device, $\lambda$ is the wavelength of operation (e.g., 1310 nm, 1550 nm), $n_0$ is a phase shift constant (e.g., on the order of $10^{-4}$, $10^{-3}$) for the device, and V is the applied voltage (e.g., 10 volts).

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A device comprising:
   a light splitter configured to receive a source light beam from a light source and split the source light beam into separate light beams, each emitted through an outlet; and
   resonators, each of which is optically coupled to at least one of the outlets and is configured to steer at least one of the light beams, each resonator includes a ring assembly and each ring assembly includes a P-I-N phase shifter, a tunable heater, and a ring structure disposed between the P-I-N phase shifter and the tunable heater.

2. The device of claim 1, wherein each resonator is configured to shift the phase of the light beam passing therethrough so that each light beam exiting from each resonator has a different phase than each other light beam exiting from each other resonator.

3. The device of claim 1, further comprising a phase shifter control module electrically connected to the P-I-N phase shifters.

4. The device of claim 3, further comprising a heater control module electrically connected to the tunable heaters and configured to control the tunable heaters to maintain a stable temperature of each resonator.

5. The device of claim 3, wherein each P-I-N phase shifter comprises a first region that couples a waveguide exiting the outlet of the light splitter to a rib waveguide, wherein the rib waveguide couples the first region to a doped region, the doped region comprising a central ribbed section having a thickness approximately equal to a thickness of the rib waveguide.

6. The device of claim 1, further comprising a variable optical attenuator (VOA) optically coupled to each resonator, wherein the VOAs are configured to equalize amplitudes of the light beams.

7. The device of claim 6, further comprising a monitor photodiode optically connected to each resonator and configured to sense the power of the light beam emitted from the corresponding resonator.

8. The device of claim 7, wherein the monitor photodiode communicates the sensed power to a VOA control module and/or a heater control module, wherein the VOA control module is configured to control the VOAs in response to receiving the sensed power, and wherein each of the resonators includes a tunable heater and the heater control module is configured to control the tunable heaters in response to receiving the sensed power.

9. The device of claim 1, further comprising an array of grating couplers configured to couple light emitted from the resonators to free space.

10. The device of claim 9, further comprising a charge-coupled device (CCD) array configured to sample light being emitted from the array of grating couplers to support a feedback loop.

11. The device of claim 1, wherein the light splitter comprises at least two light splitter components optically coupled in series, each light splitter component including one inlet port and more than one outlet port.

12. The device of claim 11, wherein each light splitter component is a multi-mode interference (MMI) light splitter.

13. A device comprising:
   a light splitter configured to receive a source light beam from a light source and split the source light beam into separate light beams, each emitted through an outlet;
   resonators, each of which is optically coupled to at least one of the outlets and is configured to steer at least one of the light beams;
   a variable optical attenuator (VOA) optically coupled to each resonator, wherein the VOAs are configured to equalize amplitudes of the light beams;
   one or more control modules; and
   a monitor photodiode optically coupled to each resonator and configured to sense power of the light beam emitted from the corresponding resonator, wherein the monitor photodiode communicates the sensed power to the one or more control modules, wherein each of the resonators includes a tunable heater,
   wherein the one or more control modules are configured to control the tunable heaters in response to receiving the sensed power.

14. The device of claim 13, wherein each resonator includes a ring assembly, wherein each ring assembly includes a P-I-N phase shifter and a ring structure disposed between the P-I-N phase shifter and the tunable heater.

15. The device of claim 14, further comprising a phase shifter control module electrically connected to the P-I-N phase shifters, the one or more control modules are electrically connected to the tunable heaters and configured to control the tunable heaters to maintain a stable temperature of each resonator.

16. The device of claim 15, wherein each P-I-N phase shifter comprises a first region that couples a waveguide exiting the outlet of the light splitter to a rib waveguide, wherein the rib waveguide couples the first region to a doped region, the doped region comprising a central ribbed section having a thickness approximately equal to a thickness of the rib waveguide.

17. The device of claim 14,
   wherein the one or more control modules are configured to control the VOAs in response to receiving the sensed power.

18. A solid state light detection and ranging (LIDAR) device comprising:
   a substrate; and
   an electronic/photonic integrated light-coupling circuit supported by the substrate and configured to consume less than one Watt of power when the electronic/photonic integrated light-coupling circuit is operating and steering light beams, the circuit comprising:
      a light splitter configured to receive a source light beam from a light source and split the source light beam into at least 200 separate light beams, each emitted through an outlet; and
      resonators, each of which is optically coupled to at least one of the outlets and is configured to steer at least one of the light beams.

19. The LIDAR device of claim 18, wherein the substrate and the electronic/photonic integrated light-coupling circuit are part of a complementary metal-oxide semiconductor (CMOS) integrated circuit.

20. The LIDAR device of claim 18, wherein each resonator includes a ring assembly and each ring assembly includes a P-I-N phase shifter, wherein each ring assembly further includes a tunable heater and a ring structure disposed between the P-I-N phase shifter and the tunable heater.

* * * * *